US006265928B1

(12) United States Patent
Tran et al.

(10) Patent No.: US 6,265,928 B1
(45) Date of Patent: Jul. 24, 2001

(54) PRECISION-CONTROLLED LOGARITHMIC AMPLIFIER

(75) Inventors: Kim Anh Tran, Garland; Chia-sam Wey, Arlington; Jukka-Pekka Neitiniemi, Irving, all of TX (US)

(73) Assignee: Nokia Telecommunications OY, Espoo (FI)

( * ) Notice: Subject to any disclaimer, the term of this patent is extended or adjusted under 35 U.S.C. 154(b) by 0 days.

(21) Appl. No.: 09/354,984

(22) Filed: Jul. 16, 1999

(51) Int. Cl.[7] .......... G06F 7/556

(52) U.S. Cl. .......... 327/350; 327/351; 327/362

(58) Field of Search .......... 327/350, 351, 327/352, 362

(56) References Cited

U.S. PATENT DOCUMENTS

| | | | | |
|---|---|---|---|---|
| 4,430,626 | * | 2/1984 | Adams | 331/108 B |
| 4,906,836 | | 3/1990 | Yamashita et al. | 259/226 |
| 5,012,140 | * | 4/1991 | Bateman | 307/491 |
| 5,578,958 | * | 11/1996 | Yasuda | 327/350 |
| 5,699,004 | * | 12/1997 | Picciotto | 327/350 |
| 6,066,976 | * | 5/2000 | Cho | 327/350 |

* cited by examiner

*Primary Examiner*—Kenneth B. Wells
*Assistant Examiner*—Paul Dinh
(74) *Attorney, Agent, or Firm*—Thomas B. Hayes; Brian T. Rivers

(57) ABSTRACT

A precision-controlled logarithmic amplifier having reduced interference parameters. In an embodiment, the invention comprises a logarithmic amplifier having an output signal providing a logarithmic representation of an input signal. A precision-control circuit is coupled to the logarithmic amplifier. The precision-control circuit produces a bias and a saturation current that act to reduce the effects of bias and saturation currents that are produced in the logarithmic amplifier and affect the output signal of the logarithmic amplifier.

8 Claims, 3 Drawing Sheets

PRECISION-CONTROLLED LOGARITHMIC AMPLIFIER

FIELD OF THE INVENTION

The present invention relates, in general, to logarithmic amplifiers and, in particular, to a method and apparatus for the reduction of unwanted interference parameters at the output of a logarithmic amplifier.

BACKGROUND OF THE INVENTION:

Without limiting the scope of the invention, its background is described in connection with logarithmic amplifiers used in a power detector.

In a wireless communication system, for example, a Global System for Mobile (GSM) system using a Time Division Multiple Access (TDMA) signaling format that includes a framed structure comprising eight time slots, a mobile station communicates with a base station by transmitting and receiving information in one or more of the time slots that comprise a channel. Each channel is assigned to a different user, with mobile-to-base transmission (uplink) on one frequency band and base-to-mobile (downlink) on a second frequency band.

In order to preserve the integrity of the transmitted and received information and to reduce adjacent channel interference, the system operates according to a standardized format that defines the requirements of transmission and reception. A system transmitting and receiving information often produces unwanted interference. This unwanted interference affects the integrity of the transmitted and received information. For example, a power control loop uses negative feedback to adjust the operating point of a power amplifier so that the power amplifier operates in a specified range. However, unwanted interference parameters inherent in the operation of the power control loop may cause an inaccurate representation of the information to be controlled in the feedback loop resulting in inaccurate adjustment of the power amplifier's operating point.

The feedback control loop controls the operation of the power amplifier by using an RF linear detector to sample the output signal and compare the output signal with a reference signal, where the reference signal is proportional to the required output. The RF linear detector output is used as an error signal to adjust the power amplifier's operating point to correct any unwanted deviations detected at the output. Unwanted interference parameters of the RF linear detector could affect the signals in the loop and may result in an incorrect adjustment of the power amplifier.

Reference is now made to FIG. 1, wherein a prior art logarithmic amplifier used in RF linear detectors is illustrated and denoted generally as 10. Logarithmic amplifier 10 includes an operational amplifier 12 and a diode 14 that operates in the small signal region. A small signal input $I_1$ is connected to the inverting input of operational amplifier 12, and the non-inverting input is coupled to ground through resistor $R_4$. Bias voltage $V_s$ is coupled to the inverting input and the anode of diode 14, through a current limiting resistor $R_b$, and produces a bias current $I_b$ that biases diode 14. The output of operational amplifier 12 is coupled to the cathode of diode 14 through resistor $R_0$. Output $V_o$ of logarithmic amplifier 10 is taken from the output of operational amplifier 12.

Ideally, output $V_o$ should be a true representation of the logarithmic value of $I_1$; however, there are parameters of the logarithmic amplifier 10 which produce variations in output $V_o$. A saturation current $I_s(T)$, in diode 14, is a function of temperature and causes variations of the output $V_o$ when operating at different temperatures (T). Bias current $I_b$, generated by $V_s$, also is an unwanted parameter at output $V_o$ that affects the linearity by introducing an additional constant voltage at output $V_o$. The effects of these interference parameters on the output $V_o$ can be seen from equation 1 below, which represents the output $V_o$ of the logarithmic amplifier 10 of FIG. 1.

$$V_o = -(I_1 + I_b)\cdot R_o - n\cdot k\cdot \ln\left(\frac{I_1 + I_b}{I_s(T)}\right) \qquad \text{Equation 1}$$

As may be seen from Equation 1, an improved apparatus to effectively remove interference parameters from the output of a logarithmic amplifier could improve the accuracy and performance of the logarithmic amplifier.

SUMMARY OF THE INVENTION:

The present invention presents an improved apparatus for reducing interference parameters at the output of a logarithmic amplifier. This allows a more accurate logarithmic representation of the input signal at the output.

In an embodiment, the invention comprises a precision controlled logarithmic amplifier comprising a logarithmic amplifier having a signal input for receiving an input signal and a signal output providing an output voltage that is a logarithmic representation of the input signal. The output voltage is affected by a first bias current and a first saturation current generated within the logarithmic amplifier. A precision-control circuit is coupled to the logarithmic amplifier. The precision-control circuit is configured to produce a second bias current and a second saturation current. The second bias current and the second saturation current act to reduce the effects of the first bias current and the first saturation current, respectively, on the output voltage of the logarithmic amplifier.

BRIEF DESCRIPTION OF THE DRAWINGS

For a more complete understanding of the present invention, including its features and advantages, reference is made to the detailed description of the invention, taken in conjunction with the accompanying drawings of which.

DETAILED DESCRIPTION OF THE INVENTION

While the use and implementation of particular embodiments of the present invention are presented in detail below, it will be understood that the present invention provides many inventive concepts, which can be embodied in a wide variety of contexts. The specific embodiments discussed herein are merely illustrative of specific ways to make and use the invention and are not intended to limit the scope of the invention.

Figure 1:
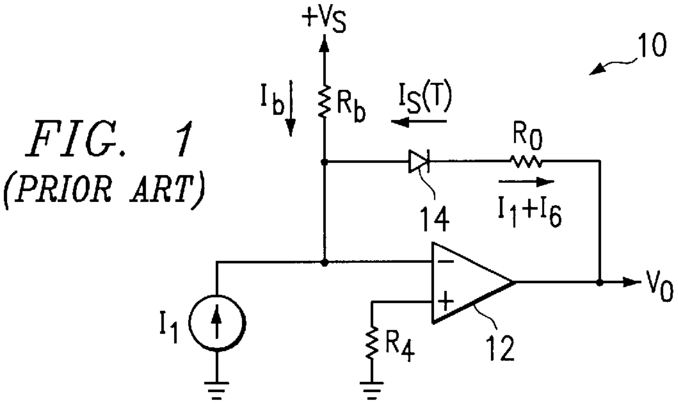
FIG. 1 (PRIOR ART)
FIG. 1 is a block diagram of a prior art logarithmic amplifier.
Figure 2:
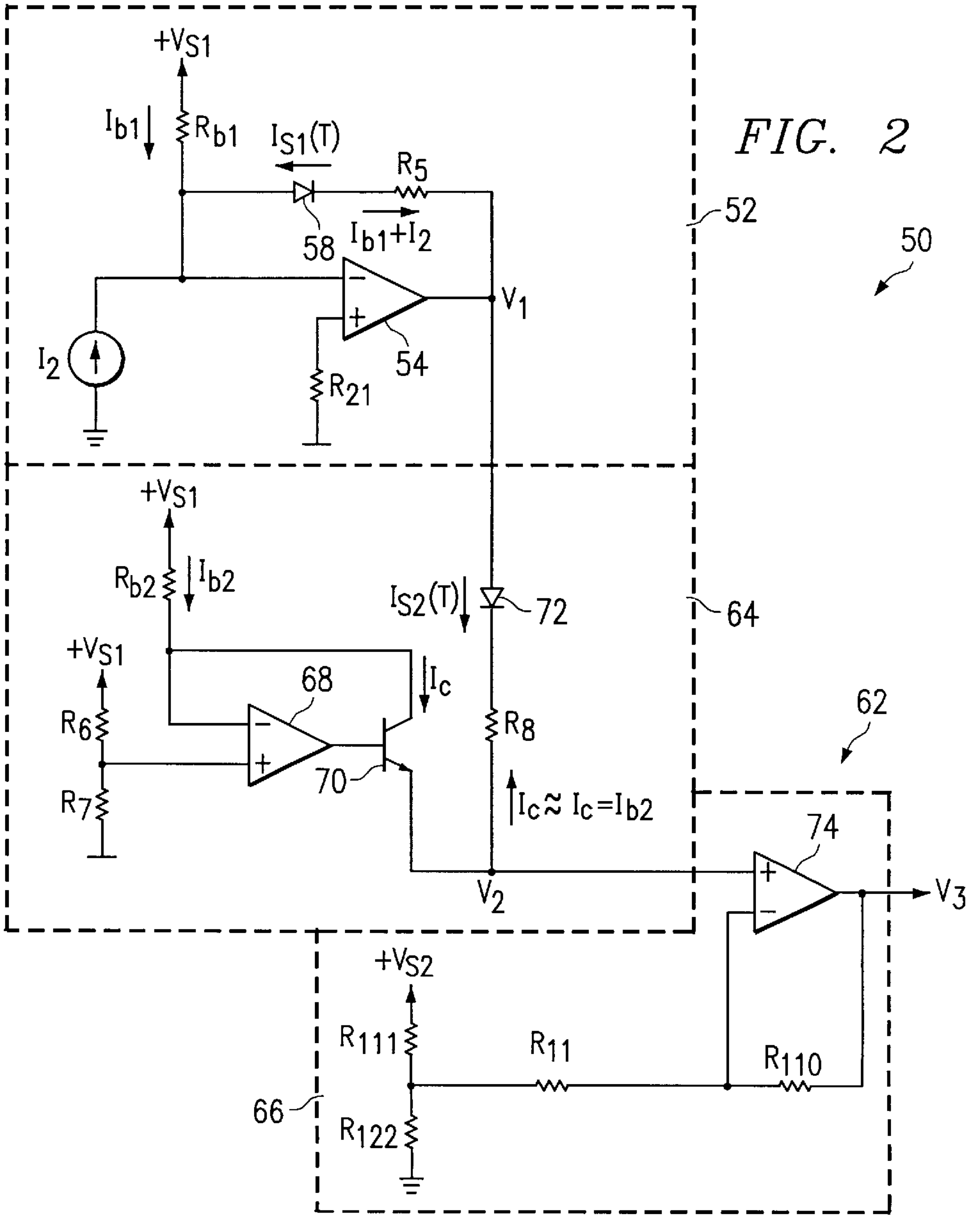
FIG. 2 is a precision-controlled logarithmic amplifier according to an embodiment of the invention.

Referring now to FIG. 2, therein is illustrated a precision-controlled logarithmic amplifier 50 according to an embodiment of the invention.

Precision-controlled logarithmic amplifier 50 includes a logarithmic amplifier 52 comprising an operational amplifier 54 having a non-inverting input coupled to ground through current limiting resistor $R_{21}$ and an inverting input coupled to a small signal input current source $I_2$. The inverting input of logarithmic amplifier 52 is coupled to signal output $V_1$ through diode 58 and series resistor $R_5$. A bias voltage source $+V_{s1}$ is coupled to the inverting input and to the anode of diode 58 through a current limiting resistor $R_{b1}$. $V_{s1}$ produces a bias current $I_{b1}$ in $R_{b1}$ that is used to bias diode 58.

Ideally, signal output $V_1$ should be a true logarithmic representation of signal input $I_2$; however, there are parameters of logarithmic amplifier 52 which cause variations in signal output $V_1$. A saturation current $I_{s1}(T)$ inherent within the operation of diode 58 is a function of temperature and is a parameter that causes variations of signal output $V_1$ when diode 58 operates at different temperatures (T). Also, bias current $I_{b1}$ introduces a constant voltage at signal output $V_1$ and affects the linearity of the output.

In order to improve the true logarithmic representation of signal input $I_2$ at the signal output $V_1$, a precision-control circuit 62 is connected to signal output $V_1$. Precision-control circuit 62 comprises a current source 64 and a current driver 66. Current source 64 is configured to produce a bias current $I_{b2}$ that is approximately equal to bias current $I_{b1}$. This creates a voltage rise across resistor $R_8$ and diode 72 reducing the effects of saturation current $I_{s1}(T)$ and bias current $I_{b1}$ from signal output $V_1$.

Current source 64 comprises operational amplifier 68 having an output connected to the base of a transistor 70. The inverting input of operational amplifier 68 is connected to the collector of transistor 70. Bias voltage source $+V_{s1}$ is coupled to the inverting input of operational amplifier 68 and the collector of transistor 70 through a current limiting resistor $R_{b2}$. Bias voltage source $+V_{s1}$ produces a bias current $I_{b2}$ equal to bias current $I_{b1}$ through resistor $R_{b2}$. Bias voltage source $+V_{s1}$ is also applied to the non-inverting input of operational amplifier 68 through a divider network of resistors $R_6$ and $R_7$. The voltage divider is required at the non-inverting input so that the collector voltage on transistor 70 is high enough above the emitter voltage to ensure an active mode of operation. Since bias current $I_{b2}$ approximately equals collector current $I_c$, and since the small signal gain factor beta of transistor 70 is made very large in the embodiment, collector current $I_c$ equals emitter current $I_e$.

$$I_{b2} = I_c \approx I_e = \left(-\frac{V_{s1} R_7}{R_6 + R_7} + V_{s1}\right) \cdot \frac{1}{R_{b2}} \qquad \text{Equation 2}$$

Bias current $I_{b2}$ equals bias current $I_{b1}$, resistor $R_8$ equals resistor $R_5$ and diode 58 and diode 72 are matched diodes and exhibit the same properties and characteristics. Diode 58 and diode 72 may also be a pair of matched diodes within the same package so that both operate approximately within the same temperature and produce similar effects during the mode of operation. The effects of saturation current $I_{s1}(T)$ and bias current $I_{b2}$ are reduced in the voltage $V_2$ at the emitter of transistor 70 as illustrated in equation 3.

$$V_2 = -(I_2 + I_{b1}) \cdot R_5 - n \cdot k \cdot T \cdot \ln\left(\frac{I_2 + I_{b1}}{I_{s1}(T)}\right) + I_{b2} \cdot R_8 + n \cdot k \cdot T \cdot \ln\left(\frac{I_{b2}}{I_{s2}(T)}\right) = -I_2 \cdot R_5 - n \cdot k \cdot T \cdot \ln\left(\frac{I_2 + I_{b1}}{I_{b1}}\right) \qquad \text{Equation 3}$$

By reducing saturation current $I_{s1}(T)$ and bias current $I_{b1}$, the temperature dependency of precision-controlled logarithmic amplifier 50 is reduced and linearity is improved. The linearity of precision-controlled logarithmic amplifier 50 may be further improved by applying a small offset voltage to $V_2$ using current driver 66 and generating an output voltage $V_3$ at current drive 66.

Current driver 66 comprises an operational amplifier 74 configured to act as a voltage follower to ensure adequate current drive at signal output $V_3$ and to provide a small offset voltage $V_{offset}$ to be applied to signal output $V_2$ of current source 64 to affect $V_3$. Operational amplifier 74 comprises a non-inverting input that is coupled to $V_2$ and an inverting input that is coupled to signal output $V_3$ through resistor $R_{110}$. A bias voltage $+V_{s2}$ is applied at the non-inverting input through divider resistor $R_{111}$ and $R_{122}$. Resistor $R_{122}$ may be adjusted to set the amount of the offset voltage to be subtracted from signal output $V_2$ to generate $V_3$.

$$V_3 = V_2 - V_{offset} = -I_2 \cdot R_5 - n \cdot k \cdot T \cdot \ln\left(\frac{I_2 + I_{b1}}{I_{b1}}\right) - V_{offset} \qquad \text{Equation 4}$$

$$V_{offset} = V_{s2}\left(\frac{R_{122}}{R_{111} + R_{122}}\right); \quad \text{Where } R_{111} \gg R_{122}$$

Figure 4:
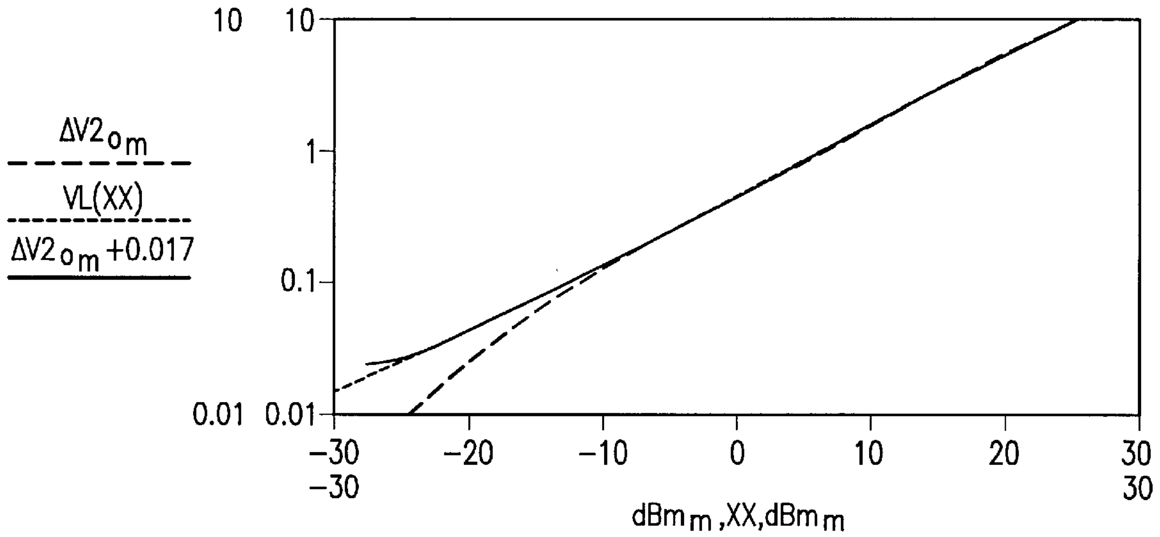
FIG. 4 is a plot illustrating the effect of including an output offset voltage in a precision-controlled logarithmic amplifier according to an embodiment of the invention.

Offset voltage $V_{offset}$ further improves the linearity of the precision-controlled logarithmic amplifier 50 and can improve the dynamic range by 15 dB or more as illustrated in FIG. 4.

FIG. 4 is a plot illustrating the effect of including an output offset voltage in a precision-controlled logarithm amplifier according to an embodiment of the invention. In FIG. 4 the dotted line represents the ideal linear relationship between power and output voltage for a logarithmic amplifier. The dashed line is $V_3$ without a $V_{offset}$ as generated by current driver 66. Without $V_{offset}$, there is substantially less dynamic range than the ideal relationship between power and output voltage. The solid line represents $V_3$ including $V_{offset}$ generated by current driver 66. $V_{offset}$ substantially improves the dynamic range of the precision-controlled logarithmic amplifier 50 to at least 15 dB or more.

Figure 3:
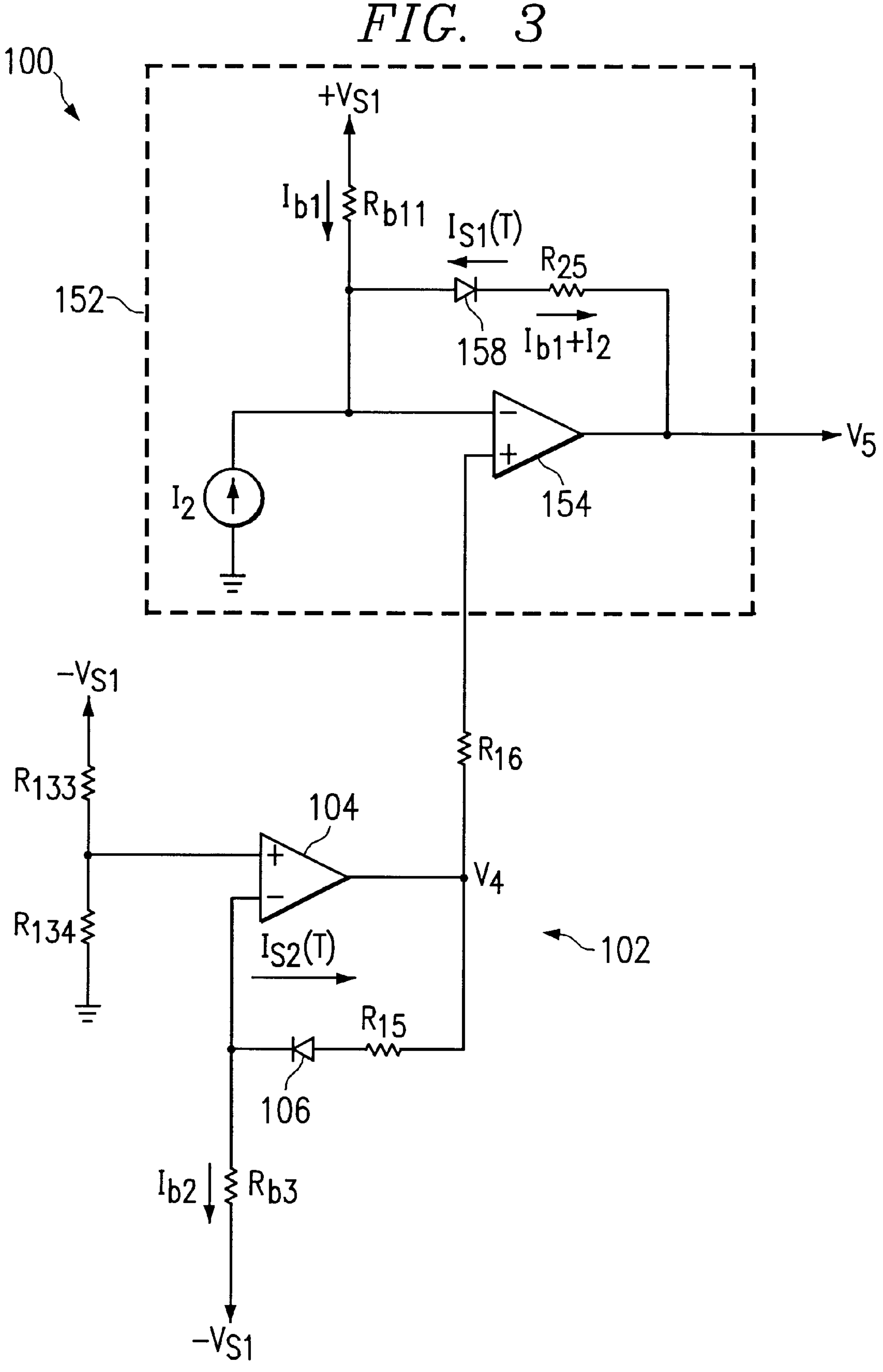
FIG. 3 is a precision-controlled logarithmic amplifier according to an alternative embodiment of the invention.

Referring now to FIG. 3, therein is shown a precision-controlled logarithmic amplifier, denoted generally as 100, according to an alternative embodiment of the invention. Precision-controlled logarithmic amplifier 100 includes a logarithmic amplifier 152 comprising an operational amplifier 154 having a non-inverting input, an inverting input and an output $V_5$. The non-inverting input of operational amplifier 154 is coupled to a precision-control circuit 102, and the inverting input is coupled to signal input $I_2$ and to output $V_5$ through diode 158 and resistor $R_{25}$. The anode of the diode 158 is coupled to the inverting input of operational amplifier 154 and the cathode of diode 158 is coupled to signal output $V_5$ through resistor $R_{25}$. Bias voltage source $+V_{s1}$ is coupled to the inverting input of operational amplifier 154 and to the anode of diode 158 through a current limiting resistor $R_{b11}$. $V_5$ produces a bias current $I_{b1}$ that is used to bias diode 158.

Ideally, signal output $V_5$ should be a true logarithmic representation of signal input $I_2$; however, there are parameters of the logarithmic amplifier 152 which produce variations of signal output $V_5$. Saturation current $I_{s1}(T)$ is a function of temperature and is a parameter that causes variations of signal output $V_5$ when diode 158 operates at different temperatures (T). Bias current $I_{b1}$ is an unwanted parameter that introduces a constant at signal output $V_5$ that affects the device's linearity.

In order to improve the representation of signal input $I_2$ at the signal output $V_5$, a precision-control circuit 102 is coupled to the non-inverting input of logarithmic amplifier 152 through resistor $R_{16}$. Signal output $V_4$ is applied to the non-inverting input. This balances the voltage drop across diode 158. The application of $V_4$ to the non-inverting input reduces the effects of saturation current $I_{s1}(T)$ and bias current $I_{b1}$ on signal output $V_5$.

Precision-control circuit 102 comprises an operational amplifier 104 having a non-inverting input, inverting input, and output. The non-inverting input of operational amplifier 104 is coupled to negative bias voltage source $-V_{s1}$ through a divider network of resistors, $R_{133}$ and $R_{134}$. Resistor $R_{133}$ and $R_{134}$ may be adjusted to select the amount of offset voltage $V_{offset}$ to be added to signal output $V_4$. Offset voltage $V_{offset}$ further improves the linearity of precision-controlled logarithmic amplifier 100 for small values of input signal $I_2$. The inverting input of operational amplifier 104 is coupled to signal output $V_4$ through diode 106 and resistor $R_{15}$. The negative bias voltage $-V_{s1}$ is coupled to the inverting input and to the cathode of diode 106 through a current limiting resistor $R_{b3}$. $-V_{s1}$ provides a bias current $I_{b2}$ to bias diode 106. $I_{b2}$ is approximately equal to $I_{b1}$ because diode 106 and diode 158 are matched, as previously described.

Output $V_4$ of precision-control circuit 102 provides a voltage rise through resistor $R_{16}$ at the non-inverting input of logarithmic amplifier 152. This reduces the effects of bias current $I_{b1}$ and saturation current $I_s(T)$ at signal output $V_5$ as shown in equations 5–7.

$$V_4 = V_{offset} + n\cdot k\cdot T\cdot \ln\left(\frac{I_{b2}}{I_{s2}(T)}\right) + I_{b2}\cdot R_{25} \quad \text{Equation 5}$$

$$V_5 = V_4 - n\cdot k\cdot T\cdot \ln\left(\frac{I_{b1}+I_2}{I_s(T)}\right) - (I_{b1}+I_2)\cdot R_5 \quad \text{Equation 6}$$

$$V_5 = V_{offset} - n\cdot k\cdot T\cdot \ln\left(\frac{I_{b1}+I_2}{I_{b1}}\right) - I_2\cdot R_{25} \quad \text{Equation 7}$$

$$V_{offset} = -V_{s1}\left(\frac{R_{134}}{R_{133}+R_{134}}\right)$$

At minimum levels of detection the linearity of the detector can be compensated for by applying a small offset voltage $V_{offset}$ at signal output $V_4$. Typically, logarithmic amplifiers are used as linearizers in power detectors, and generally power detectors require a minimum power level input before the power detector can work effectively. Offset voltage $V_{offset}$ further improves the linearity of the precision-controlled logarithmic amplifier 100 as was described for FIG. 4 in relation to the embodiment of FIG. 2.

Figure 5:
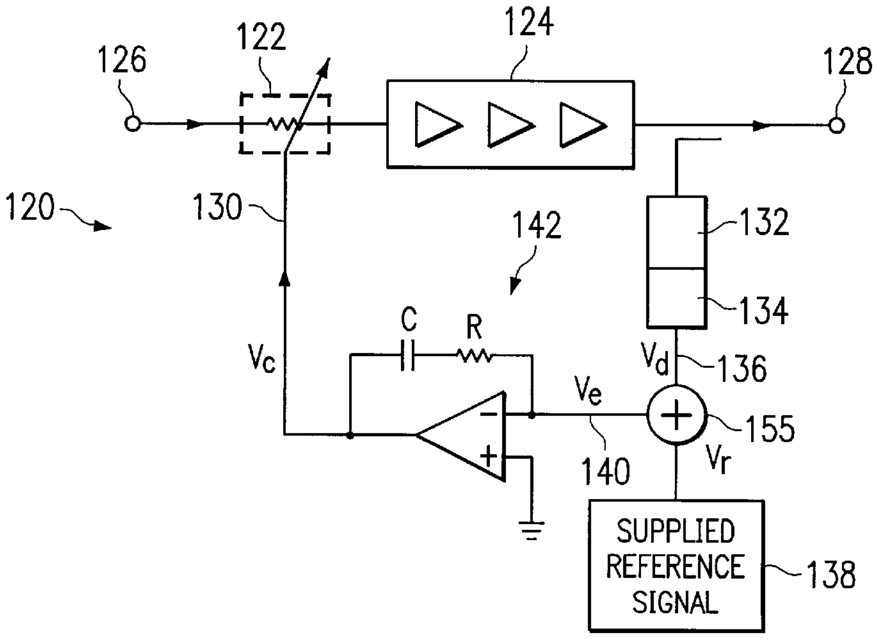

Referring to FIG. 5, therein is illustrated an example of an application in which the embodiment of FIG. 2 or 3 may be utilized. The particular application of FIG. 5 is a power control loop application. FIG. 5 shows a power control loop 120. A variable attenuator 122 is coupled to the input of an amplifier chain 124, and variable attenuator 122 and amplifier chain 124 are disposed between input 126 and output 128. A control signal $V_c$ on line 130 is applied to variable attenuator 122 to control the attenuation characteristics of variable attenuator 122. A power detector 132 and linearizer 134 are coupled to the output of the amplifier chain 124. A logarithmic amplifier according to the embodiment of FIG. 2 or 3 may be implemented in linearizer 134. A portion of the output signal is detected by power detector 132 and converted to a linear signal $V_d$, in linearizer 134. $V_d$ is input to comparator 155. $V_d$ is compared against a supplied reference signal $V_r$ from reference signal source 138. $V_r$ is proportional to the desired output. $V_r$ is compared to $V_d$ and the difference, an error signal $V_e$ at line 140, is integrated by integrator 142 to provide control signal $V_c$ at line 130 to variable attenuator 122.

Parameters inherent in the logarithmic amplifiers introduce unwanted parameters at the output of the logarithmic amplifier resulting in an inaccurate representation of the detected signal. An inaccurate linear output produces an inaccurate error signal $V_e$. An inaccurate $V_e$, in turn, produces a control signal $V_c$ that may cause the power amplifier to deviate from its required operating point. Implementation of either precision-controlled logarithmic amplifier 50 or 100 in linearizer 134 would eliminate unwanted parameters from the output and provide a more accurate representative $V_d$ of the detected signal, $V_c$.

While this invention has been described with reference to particular embodiments, this description is not intended to be limiting. Various modifications and combinations of the illustrative embodiments, as well as other embodiments of the invention, will be apparent to persons skilled in the art. It is, therefore, intended that the appended claims encompass any such modifications or embodiments.

What is claimed is:

1. A precision-controlled logarithmic amplifier comprising:

a bias voltage source for supplying a first bias current through a first resistor;

a logarithmic amplifier having a signal input for receiving an input signal and an output for providing an output voltage that is a logarithmic representation of said input signal, wherein said output voltage is affected by the first bias current;

a first diode having an anode and a cathode, said anode coupled to the bias voltage source through said first resistor and to said signal input, said cathode coupled to said output of said logarithmic amplifier through a second resistor, the first diode generating a first saturation current affecting the output; and a control circuit comprising an output coupled to said logarithmic amplifier, wherein said control circuit produces a second bias current and a second saturation current, and wherein said second bias current and said second saturation current act to reduce the effects of said first bias current and said first saturation current, respectively, on said output voltage of said logarithmic amplifier.

2. The precision-controlled logarithmic amplifier as recited in claim 1, wherein said logarithmic amplifier further comprises:

a first operational amplifier comprising a non-inverting input coupled to ground and an inverting input coupled to said bias voltage source through said first resistor and to said signal input, further said first operational amplifier comprising an output that comprises said output of said logarithmic amplifier.

3. The precision-controlled logarithmic amplifier as recited in claim 2, wherein said control circuit coupled to said logarithmic amplifier is coupled to said output of logarithmic amplifier.

4. The precision-controlled logarithmic amplifier as recited in claim 3, wherein said control circuit further comprises:

a third resistor having first and second leads;

a second diode having a cathode and an anode with said cathode of said second diode coupled to said output of said logarithmic amplifier and said anode of said second diode coupled to said first lead of said third resistor; and a current source comprising an output coupled to said second lead of said third resistor, said current source providing said second bias current through said third resistor and said second diode.

5. The precision-controlled logarithmic amplifier of claim 4, wherein said control circuit further comprises a DC offset circuit having an input and an output, said input of said DC offset circuit coupled to said output of said current source and to said second lead of said third resistor.

6. The precision controlled logarithmic amplifier as recited in claim 5, wherein said DC offset circuit further comprises:

a fourth resistor;

a third operational amplifier having a non-inverting input coupled to said output of said current source and the second lead of said third resistor, and an inverting input coupled to a DC offset voltage, and said output of said DC offset circuit through said fourth resistor, wherein said output of said DC offset circuit outputs the difference of said input of said DC offset circuit and said DC offset voltage at said output of said DC offset circuit.

7. The precision controlled logarithmic amplifier as recited in claim 4, wherein said current source further comprises:

a fifth resistor;

a second operational amplifier having an output and a non-inverting input coupled to a DC voltage, and said second operational amplifier further having an inverting input coupled to said bias voltage source through said fifth resistor; and a transistor having a base coupled to said output of said second operational amplifier, said transistor further having a collector coupled to said inverting input of said second operational amplifier, and an emitter coupled to said second lead of said third resistor, wherein said emitter provides said second bias current.

8. The precision-controlled logarithmic amplifier of claim 2, wherein said control circuit further comprises:

a first, second and third resistor;

a second diode having an anode and a cathode; and a second operational amplifier having a non-inverting input, an inverting input and an output, wherein said non-inverting input of said second operational amplifier is coupled to said bias voltage source, said output of said second operational amplifier is coupled to said non-inverting input of said first operational amplifier through said first resistor, said inverting input of said second operational amplifier is coupled to said bias voltage source through said third resistor and to said cathode of said second diode, and said anode of said second diode is coupled to said output of said second operational amplifier through said second resistor.

* * * * *